(12) United States Patent
Widemann et al.

(10) Patent No.: US 10,934,886 B2
(45) Date of Patent: Mar. 2, 2021

(54) METHOD FOR MANAGING A BREAKDOWN OF A TURBINE ENGINE STARTER VALVE

(71) Applicant: Safran Aircraft Engines, Paris (FR)

(72) Inventors: Adel Cedric Abir Widemann, Moissy-Cramayel (FR); David Julien Boyer, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 242 days.

(21) Appl. No.: 16/327,269

(22) PCT Filed: Aug. 24, 2017

(86) PCT No.: PCT/FR2017/052272
§ 371 (c)(1),
(2) Date: Feb. 21, 2019

(87) PCT Pub. No.: WO2018/037193
PCT Pub. Date: Mar. 1, 2018

(65) Prior Publication Data
US 2019/0234232 A1 Aug. 1, 2019

(30) Foreign Application Priority Data

Aug. 25, 2016 (FR) ..................... 1657937

(51) Int. Cl.
*F01D 19/00* (2006.01)
*F02C 7/268* (2006.01)
(Continued)

(52) U.S. Cl.
CPC ............ *F01D 19/00* (2013.01); *F01D 17/06* (2013.01); *F01D 17/08* (2013.01); *F02C 7/232* (2013.01);
(Continued)

(58) Field of Classification Search
CPC .. F16K 37/0041; F16K 37/0083; F02C 7/268; F02C 7/27; F02C 7/277
See application file for complete search history.

(56) References Cited

U.S. PATENT DOCUMENTS

| 4,702,273 A | 10/1987 | Allen et al. |
| 5,159,835 A * | 11/1992 | Nafziger ................ F16K 37/00 |
| | | 73/584 |

(Continued)

FOREIGN PATENT DOCUMENTS

| FR | 2972485 A1 | 9/2012 |
| FR | 3007461 A1 | 12/2014 |
| FR | 3012420 A1 | 5/2015 |

OTHER PUBLICATIONS

Preliminary Research Report and Written Opinion received for French Application No. 1657937, dated May 12, 2017, 8 pages (1 page of French Translation Cover Sheet and 7 pages of original document).

(Continued)

*Primary Examiner* — Todd E Manahan
*Assistant Examiner* — Thuyhang N Nguyen
(74) *Attorney, Agent, or Firm* — Womble Bond Dickinson (US) LLP

(57) ABSTRACT

The present invention concerns a method (200) for managing a breakdown of a starter valve of a starting circuit of an aircraft turbine engine, comprising the following steps: —starting (203) the turbine engine, a state-change command being sent to the starter valve in order for it to open; —increasing (204) the engine speed of the turbine engine to a predefined first threshold, —during said increase (204) in engine speed, —if a difference in position has been detected (201) between the position sensors before the step of starting the turbine engine or if a difference in position is detected (205) between said position sensors, determining (207) the (Continued)

position sensor that has switched between the closed position and the open position, the other position sensor having remained in the open or closed position; —when the first threshold is reached, storing (209) the position sensor that has switched between the closed position and the open position as healthy and the position sensor that has remained in the open or closed position as faulty, so as to measure the state of the starter valve only on the basis of the position of the healthy position sensor.

10 Claims, 7 Drawing Sheets

(51) Int. Cl.
  *F02C 7/232* (2006.01)
  *F01D 17/08* (2006.01)
  *F16K 37/00* (2006.01)
  *F01D 17/06* (2006.01)

(52) U.S. Cl.
  CPC .......... *F02C 7/268* (2013.01); *F16K 37/0041* (2013.01); *F16K 37/0083* (2013.01); *F05D 2220/323* (2013.01); *F05D 2260/80* (2013.01); *F05D 2260/85* (2013.01); *F05D 2270/02* (2013.01); *F05D 2270/304* (2013.01)

(56) References Cited

U.S. PATENT DOCUMENTS

| | | | |
|---|---|---|---|
| 10,082,445 B2 * | 9/2018 | Djebali | .................... F01D 17/08 |
| 2004/0221896 A1 * | 11/2004 | Ballenger | ........... F16K 37/0041 |
| | | | 137/554 |
| 2013/0340442 A1 | 12/2013 | Djebali | |

OTHER PUBLICATIONS

International Search Report and Written Opinion received for PCT Patent Application No. PCT/FR2017/052272, dated Nov. 24, 2017, 17 pages (8 pages of English Translation and 9 pages of Original Document).

International Preliminary Report on Patentability received for PCT Patent Application No. PCT/FR2017/052272, dated Mar. 7, 2019, 13 pages (7 pages of English Translation and 6 pages of Original Document).

* cited by examiner

METHOD FOR MANAGING A BREAKDOWN OF A TURBINE ENGINE STARTER VALVE

GENERAL TECHNICAL FIELD

The present invention relates to a method for managing a breakdown of a starter air valve of an aircraft turbine engine, particularly for managing a breakdown due to a difference between two position sensors of the starter air valve, one of the position sensors indicating that the starter air valve is in the open state, the other of the position sensors indicating that the starter air valve is in the closed state.

PRIOR ART

Conventionally, the starting circuit of an aircraft turbine engine is connected, on the one hand, to a pressurized air circuit of the aircraft and, on the other hand, to a pneumatic starter which delivers a driving torque to a shaft of the turbine engine, by means of the gearbox. This driving torque allows all of the resisting torques imposed on said shaft, and resulting primarily from the aerodynamic drag of the rotating portions, from the mechanical friction of parts in contact and from losses by viscous friction between parts immersed in a lubricating fluid of the hydraulic circuits for lubrication and/or thermal regulation associated with said turbine engine, to be overcome. The starter accelerates the turbine engine progressively and, when a predefined engine speed is attained, the injection and the ignition of the fuel in the combustion chamber of the turbine engine are initiated. Then, at another predefined engine speed, the action of the starter is stopped and the turbine engine continues to accelerate thanks to the combustion of the fuel in the combustion chamber. The starter is for example provided on the casing of a fan of the turbine engine.

The starting circuit further comprises a starter air valve controlled by a control device and configured to change state between a closed position in which it prevents the pressurized air from reaching the starter and an open position in which it allows the pressurized air to reach the starter. To that end, the starter air valve is for example a butterfly type valve and comprises a door configured to pivot around a pivoting axis so as to prevent the pressurized air from reaching the starter in the closed position and allowing the pressurized air to reach the starter in the open position. When the starter air valve is open, pressurized air penetrates into the starter turbine, which then transforms the pneumatic energy into mechanical energy to rotate the shaft of the turbine engine.

The monitoring of the open or closed position of the starter air valve is essential. Any untimely opening of the starter air valve during the operation of the turbine engine, other than during starting, and therefore during the flight of the aircraft, is such as to perturb the operation and the performance of the turbine engine, or even damage the starter. In fact, when the starter air valve opens in an untimely manner during the operation of the turbine engine, the turbine engine shaft is driven in rotation both by the energy of the fuel and by the starter which is not designed to operate at this speed. Moreover, such an untimely opening of the starter air valve causes a purge of the pressurized air circuit of the aircraft, which could lead to the emptying of the air reserves of the aircraft.

The state of the starter air valve is monitored by means of two distinct position sensors of the switch type.

The position sensors generally comprise a movable contact, the movement of which between an open position and a closed position is driven by the pivoting of the door of the starter air valve. When the starter air valve is in the open position, the movable contact of the position sensors is in contact with a fixed opening contact (open position), so as to supply the control device with the information that the starter air valve is in the open position. Likewise, when the starter air valve is in the closed position, the movable contact of the position sensors is in contact with a fixed closure contact (closed position), so as to supply the control device with the information that the starter air valve is in the closed position.

When, after a valve state-change command, the two position sensors supply the control device with contradictory information, i.e. one of the position sensors indicates that the valve is in the open position and the other of the position sensors indicates that the valve is in the closed position, it is not possible to know if the valve has in fact changed its state. This difference in information supplied by the position sensors is commonly called a "difference breakdown".

Such a situation occurs for example when a contact weld has occurred between the movable contact and the fixed closure contact of one of the position sensors. The movable contact of said sensor can then no longer follow the pivoting of the door of the starter air valve to the open position. This is in particular due to the fact that the starter air valve is in the closed position most of the time, the movable contact and the fixed closure sensor of the position sensors thus being in contact essentially through their entire lives. This is also due to the vibrations of the turbine engine during operation which end up generating friction which glues the movable contact against the fixed closure contact.

When the difference breakdown occurs when the aircraft is still on the ground, an alert is signaled to the pilot to avoid takeoff. Then, the aircraft is inspected to verify if one of the position sensors or the valve is faulty. Such a procedure is satisfactory from the point of view of flight safety, but it is relatively costly and constraining for the operation of the aircraft.

In fact, when the difference breakdown occurs, the aircraft is not necessarily at its maintenance base; it is therefore difficult to obtain the parts to be replaced quickly. Moreover, when the difference breakdown occurs when the aircraft is still on the ground, the alert is signaled to the pilot when the aircraft is ready for takeoff, particularly with passengers on board.

Document FR 2 972 485 proposes a method for monitoring the change of state of a starter air valve of a turbine engine, making it possible to determine whether the valve has in fact changed state following the valve state-change command, independently of the information indicated by the two position sensors associated with the valve. To that end, this document proposes measuring the pressure under the casing of the fan of the turbine engine by means of a pressure sensor. In fact, when the starting valve passes from the closed position to the open position, air leaves the turbine of the starter and invades the nacelle of the fan. This generates a slight increase in pressure in the nacelle which can thus be measured as being representative of the opening of the starter air valve.

However, depending on the turbine engines, the pressure jump measured by the pressure sensor may not be sufficient with respect to the accuracy of said pressure sensor and due to possible other sources of air, such as the rupture of a pipe for example.

PRESENTATION OF THE INVENTION

The present invention has as its goal to mitigate the aforementioned disadvantages. To this end, the invention proposes a method for managing a breakdown of the starter air valve in which the success of the starting of the turbine engine to confirm that the starter air valve actually opened and to isolate the position sensor of the starter air valve which is possibly faulty.

More precisely, the present invention has as its object a method for managing a breakdown of a starter air valve of a starter circuit of an aircraft turbine engine, said starter circuit comprising a starter and a duct configured to be connected to a pressurized air supply device, the duct comprising a starter air valve configured to change state between a closed position in which it blocks the duct and an open position in which it puts into communication the pressurized air supply device and the starter, the starter air valve comprising two position sensors configured to switch between an open position when said starter air valve is in the open position and a closed position when said starter air valve is in the closed position, said method comprising the following steps consisting of:
  starting the turbine engine, a state-change command being sent to the starter air valve so that it opens;
  increasing the engine speed until a first predetermined threshold;
  during said increase of the engine speed of the turbine engine:
    if a difference has been detected between the positions of the position sensors prior the step of starting the turbine engine, one of the position sensors being in the closed position, the other of the position sensors being in the open position, determining the position sensor having switched between the closed position and the open position, the other position sensor having remained in the open position;
    otherwise:
      detecting a difference between the positions of the position sensors, one of the position sensors being in the closed position, the other of the position sensors being in the open position;
      determining the position sensor having switched between the close position and the open position, the other position sensor having remained in the closed position;
  when the first turbine engine speed threshold is reached:
    storing of the position sensor having switched between the closed positon and the open position as being healthy and the position sensor having remained in the open or closed position as faulty, so as to measure the state of the starter air valve only on the basis of the position of the healthy position sensor.

It is advantageously verified, during the initiation of the starting of the turbine engine or when the turbine engine has reached the first threshold, that a difference is still detected between the positions of the position sensors.

Advantageously, the engine speed corresponds to the speed of rotation of a high-pressure shaft of the turbine engine.

Advantageously, when the turbine engine reaches the first threshold, a combustion chamber of the turbine engine is not yet lit.

Advantageously, the method further comprises the steps consisting of:
  lighting a combustion chamber of the turbine engine;
  increasing the engine speed of the turbine engine until a second predetermined threshold;
  during said increase of the engine speed of the turbine engine:
    sending a state-change command to the starter air valve so that it closes; then,
    if a difference has been detected between the positions of the position sensors prior the step consisting of sending the state-change command to the starter air valve, one of the position sensors being in the closed position, the other of the position sensors being in the open position, determining the position sensor having switched between the open position and the closed position, the other position sensor having remained in the closed position;
    otherwise:
      detecting a difference between the positions of the position sensors, one of the position sensors being in the closed position, the other of the sensors being in the open position;
      determining the position sensor having switched between the open position and the closed position, the other position sensor remaining in the open position;
  when the second engine speed threshold of the turbine engine is reached:
    storing the position sensor having switched between the open position and the closed position as healthy, and of the position sensor remained in the closed or open position as faulty, so as to measure the state of the starter air valve only on the basis of the position of the healthy position sensor.

It is advantageously verified, during the sending of the state-change command to the starter air valve or when the turbomachine has reached the second threshold, that a difference is still detected between the positions of the position sensors.

Advantageously, the position sensor having switched between the closed position and the open position or between the open position and the closed position is stored in memory after having been determined.

Advantageously, the method further comprises the steps consisting of:
  shutting down the turbine engine;
  reducing the engine speed of the turbine engine until the third predetermined threshold;
  when the engine speed has reached the third threshold, deleting the data according to which one of the position sensors is healthy and the other of the position sensors is faulty.

The present invention also has as its object a starting circuit of an aircraft turbine engine, comprising:
  a starter,
  a duct configured to be connected to a pressurized air supply device, the duct comprising a starting valve configured to change state between a closed position in which it blocks the duct and an open position in which it puts into communication the pressurized air supply device and the starter, the starter air valve comprising two position sensors configured to switch between an open position when said starter air valve is in the open position and a closed position which said starter air valve is in the closed position,
  a control device configured to implement steps of the method for managing of a starter air valve breakdown as previously described.

The invention also has as its object an aircraft turbine engine comprising a starting circuit as previously described.

PRESENTATION OF THE FIGURES

Other features, goals and advantages of the present invention will appear upon reading the detailed description that follows, and with reference to the appended drawings given by way of examples and in which.

DETAILED DESCRIPTION OF THE INVENTION

Figure 1:
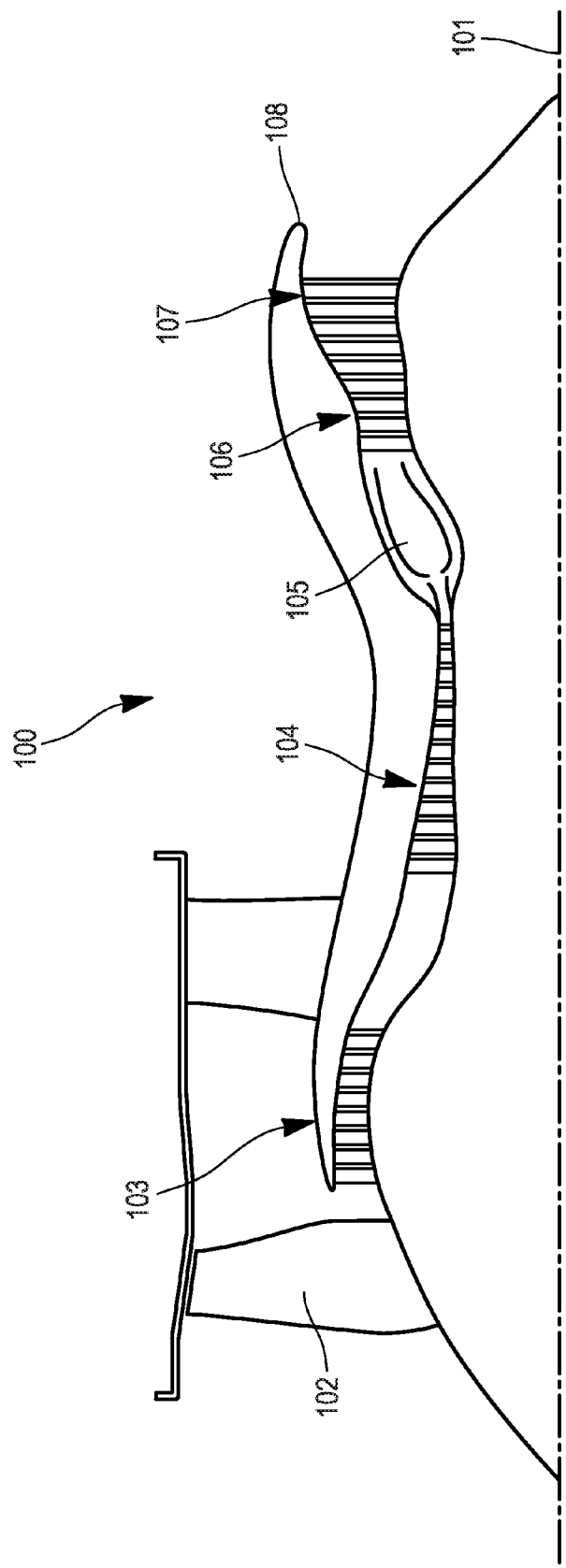
FIG. 1 is a schematic section view of a turbine engine according to one embodiment of the invention.

FIG. 1 shows an aircraft turbine engine 100 comprising means of implementing a method 200 for managing a breakdown of a starter air valve 13 of a starting circuit 10 of the turbine engine 100.

The turbomachine 100 extends along an axis of rotation 101 and comprises, from upstream to downstream, in the flow direction of the gases, a fan 102, one or more compressor stages, for example a low-pressure compressor 103 and a high-pressure compressor 104, a combustion chamber 105, one or more turbine states, for example a high-pressure turbine 106 and a low-pressure turbine 107, and a gas exhaust nozzle 108. The fan 102, the low-pressure compressor 103 and the low-pressure turbine 107 are connected to a low-pressure shaft extending along the axis of rotation 101. The high-pressure compressor 104 and the high-pressure turbine 106 are connected to a high pressure shaft provided around the low-pressure shaft. The low-pressure turbine 107 drives the low-pressure shaft in rotation, while the high-pressure turbine 106 drives the high-pressure shaft in rotation.

Figure 2:
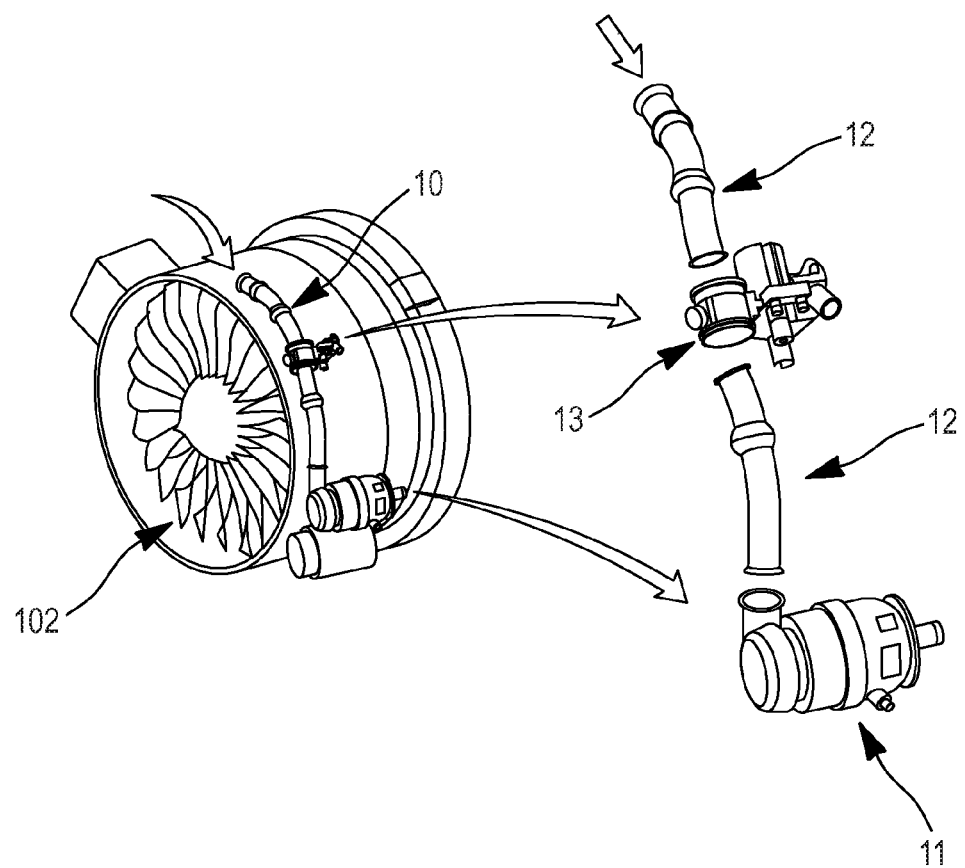
FIG. 2 is a schematic view of a starting circuit of the turbine engine illustrated in FIG. 1, and in particular of a starter air valve of said starting circuit.

The turbine engine 100 further includes a starting circuit 10 comprising a starter 11 of the pneumatic type which is for example provided on the casing of the fan 102 of the turbine engine 100 and which is supplied with pressurized air by a duct 12 connected to a supply device (not shown). The starting circuit 10 is illustrated in FIG. 2. The duct 12 comprises a starter air valve 13 (or "starter air valve") configured to change state between a closed position in which it blocks the duct 12 and an open position in which it puts into communication the supply device and the starter 11 and thus allows pressurized air to drive the starter 11. The starter air valve 13 is for example of the butterfly type. The supply device can supply air pressurized by means of an auxiliary power unit (APU) situated in the aircraft or by a ground unit or perhaps supply air extracted from another already started turbine engine.

Figure 3:
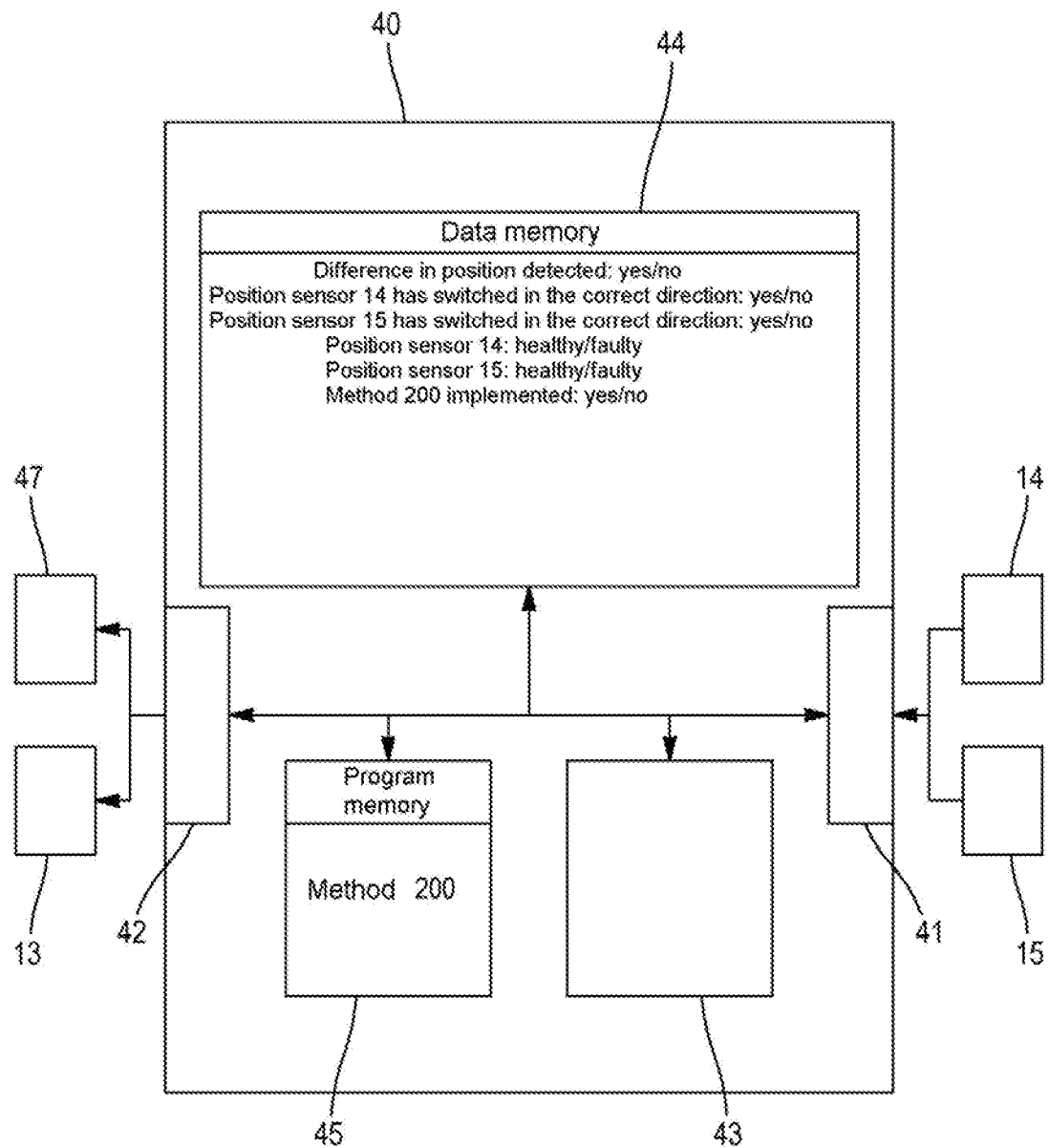
FIG. 3 is a schematic view of a control device of the starting valve illustrated in FIG. 2.

The starting circuit 10 further comprises a control device 40 configured to implement the method 200 for managing a breakdown of the starting valve 13 of the starting circuit 10. One example of a control device 40 is illustrated in more detail in FIG. 3. The control device 40 comprises an input interface 41, an output interface 42 connected to the starter air valve 13, a computer 43, a data memory 44, a program memory 45 in which is recorded the method 200 for managing a breakdown of the starter air valve 13 and at least one communication buss 46. A user interface 47 can further be connected to the output interface 42. The starter air valve 13 can also be controlled directly by the pilot of the aircraft and not by the control device 40.

During a starting phase of the turbine engine 100, the aircraft being on the ground, the control device 40 of the turbine engine 100 sends to the starter air valve 13, in particular to its output interface 42, a state-change command so that the starter air valve 13 opens, i.e. the starter air valve 13 passes from the closed position to the open position.

When the starter air valve 13 is in the open position, the pressurized air circulates in the duct 12 to drive the starter 11. The starter 11 then drives in rotation the movable high-pressure portions of the turbine engine 100, until the engine speed of the turbine engine 100 is sufficient for starting to take place. When the engine speed of the turbine engine 100 is sufficient, injection and ignition of the fuel in the combustion chamber 105 of the turbine engine 100 are initiated.

Then, when the turbine engine 100 is started, the control device 40 sends to the starter air valve 13, in particular via its output interface 42, a state-change command so that the starter air valve 13 closes, i.e. the starter air valve 13 passes from the open position to the closed position. The starter air valve 13 then blocks the duct 12, so that the starter 11 is no longer driven by pressurized air.

The state of the starter air valve 13, i.e. whether it is in the open position or in the closed position, is monitored by means of two position sensors 14, 15 of the starter air valve 13. These two position sensors 14, 15 are connected to the control device 40, particularly via its input interface 41. The position sensors 14, 15 are configured to switch between an open position, when the starter air valve 13 is in the open position, and a close position, when the starter air valve 13 is in the closed position. Thus, the position of the position sensors 14, 15 is representative of the state of the starter air valve 13.

Figure 4A:
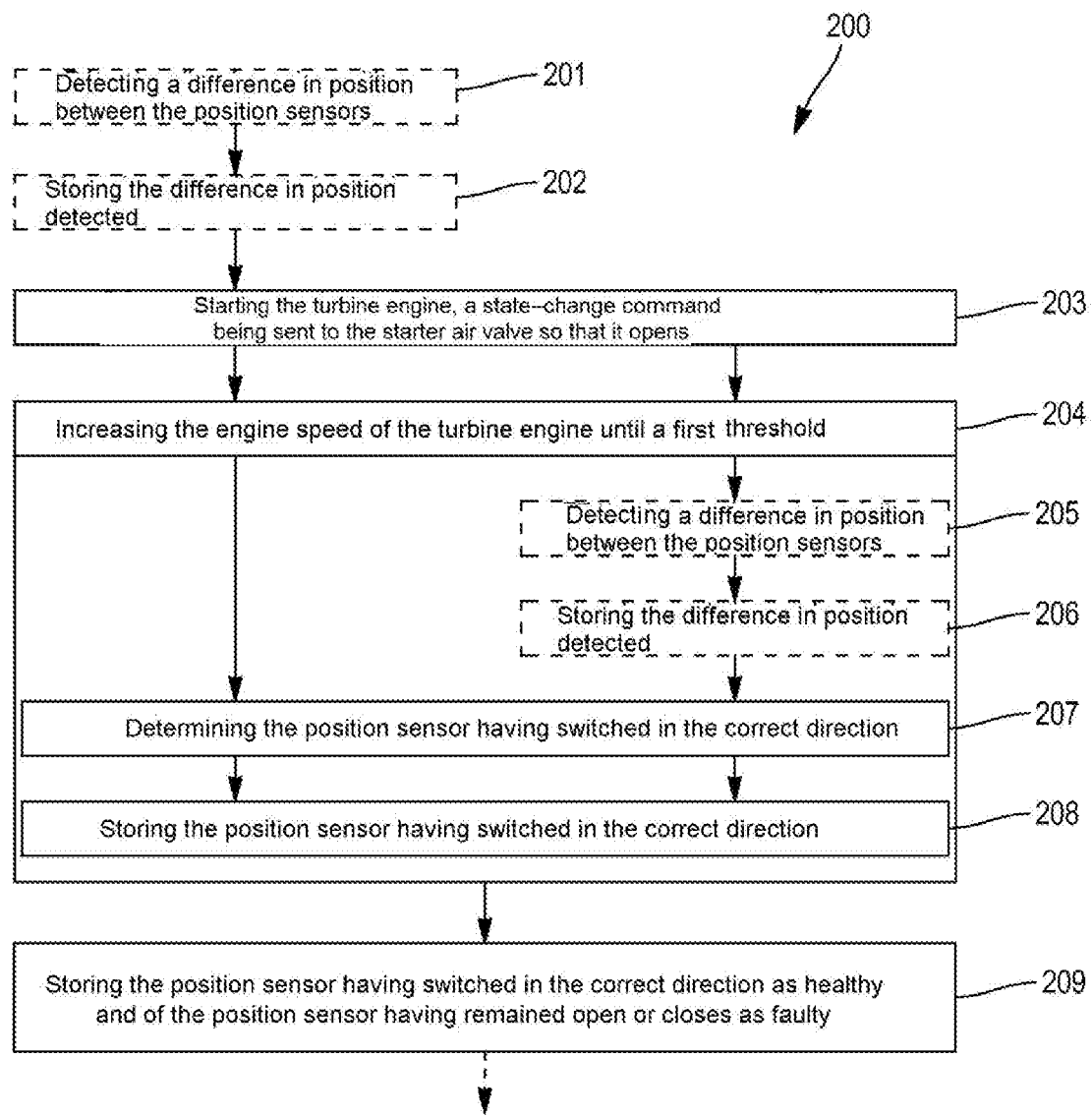
FIGS. 4a to 4c are flowcharts of a method for managing a breakdown of the starter air valve of the starting circuit according to one embodiment of the invention.
Figure 4B:
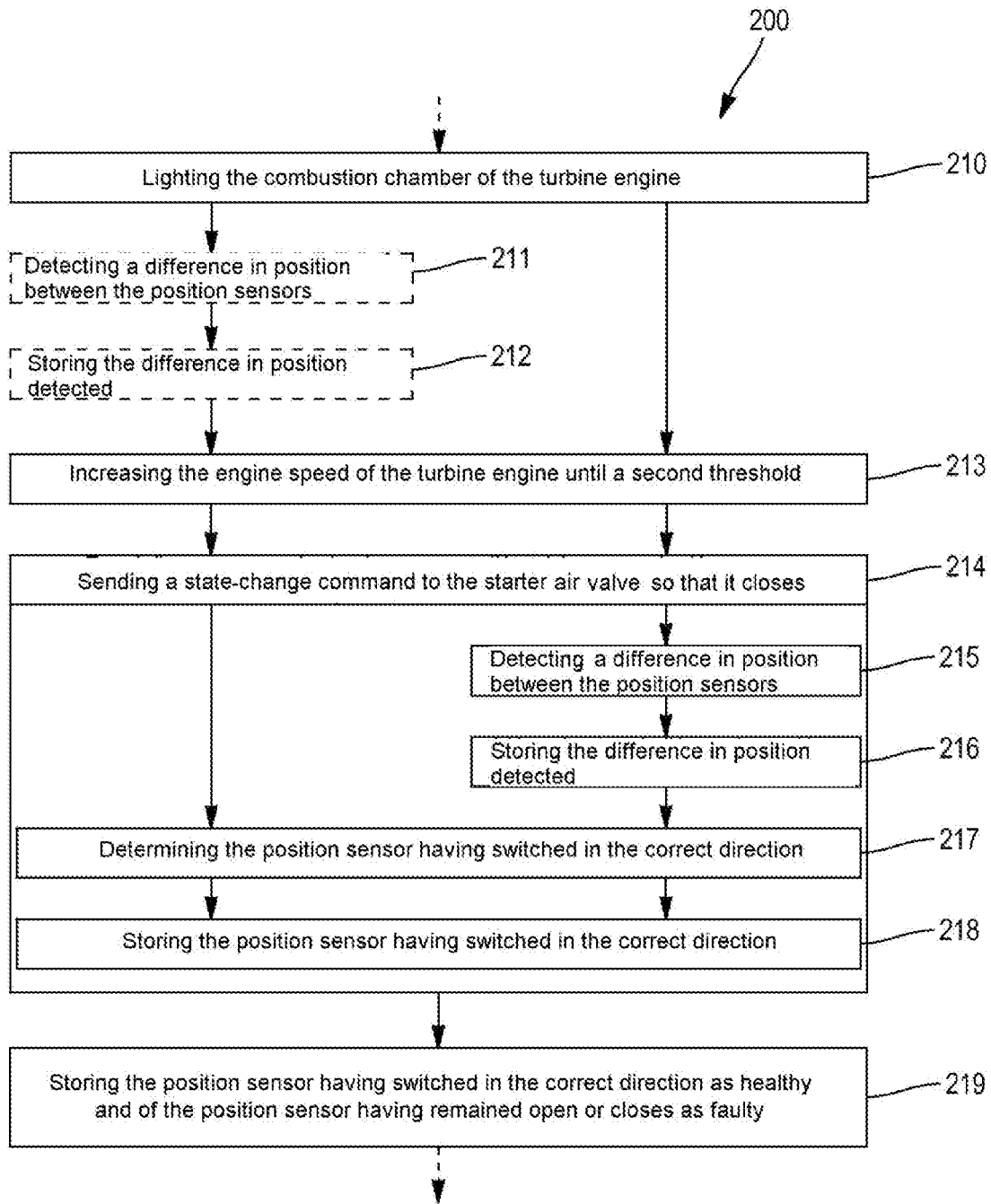
Figure 4C:
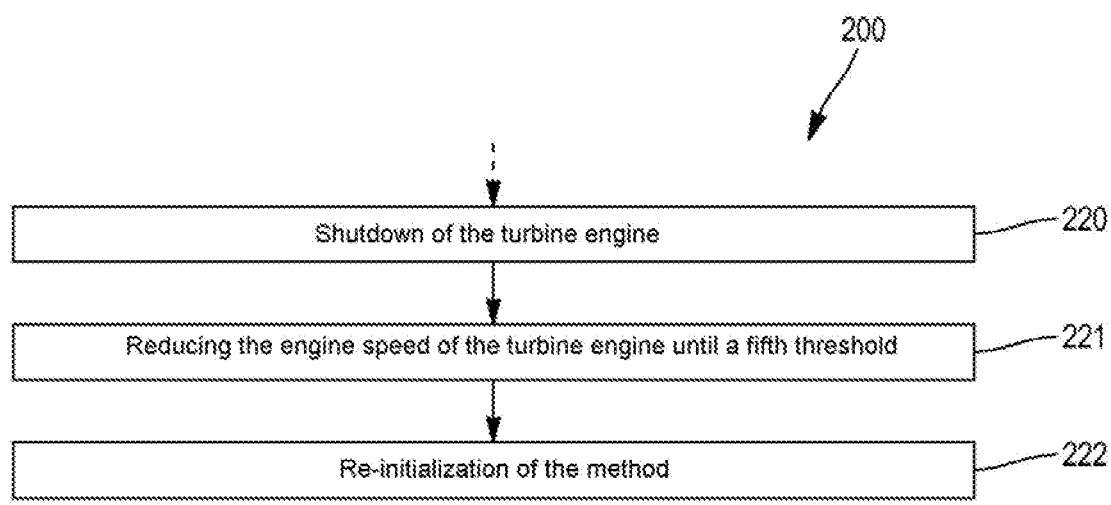

FIGS. 4a to 4c show the method 200 for managing a breakdown of the starter air valve 13 which is implemented by the control device 40. The method 200 comprises the following steps consisting of:

starting 203 the turbine engine 100, a state-change command being sent to the starter air valve 13 so that it opens;

increasing 204 the engine speed of the turbine engine 100 until a first predetermined threshold $S_1$;

during said increase 204 of the engine speed of the turbine engine 100:

if a difference has been detected 201 between the positions of the position sensors 14, 15 prior to the starting step of the turbine engine 100, one of the position sensors 14, 15 being in the closed position, the other of the position sensors 15, 14 being in the open position, determining 207 the position sensor 14, 15 having switched between the closed position and the open position, the other position sensor 15, 14 having remained in the open position;

otherwise:

detecting 205 a difference between the positions of the position sensors 14, 15, one of the position sensors 14, 15 being in the closed position, the other of the sensors 15, 14 being in the open position;

determining 207 the position sensor 14, 15 having switched between the closed position and the open position, the other position sensor 15, 14 having remained in the closed position;

when the first threshold $S_1$ of the engine speed of the turbine engine 100 is reached:

storing 209 the position sensor 14, 15 having switched between the closed position and the open position as healthy and of the position sensor 15, 14 remained in the open or closed position as faulty, so as to measure the state of the starter air valve 13 only on the basis of the position of the healthy position sensor 14, 15.

In other words, the position of the position sensor 14, 15 stored 209 as healthy will be considered as being the only representative of the state, or of the effective position, of the starter air valve 13.

In this manner, the method 200 uses the success of the starting of the turbine engine 100 to confirm that the starter air valve 13 actually opened and thus isolate the position sensor 15, 14 which is faulty. In other words, the success of the starting of the turbine engine 100 allows the starter air valve 13 breakdown to be arbitrated.

Thus, if the starter air valve 13 opens in an untimely manner during the flight of the aircraft, the control device 40 will be capable of knowing which of the position sensors 14, 15 is supplying the position representative of the state of the starter air valve 13, the other of the position sensors 15, 14 having been isolated.

Moreover, since one of the position sensors 14, 15 is giving reliable information regarding the state of the starter air valve 13, it is no longer necessary to signal the difference breakdown to the pilot, nor to inspect the aircraft to verify whether one of the position sensors 14, 15 or the starter air valve 13 is faulty. The method 200 therefore allows ensuring the safety of flights in a low-cost manner that is less constraining for the operation of the aircraft.

It will be noted, however, that if no difference breakdown, i.e. no difference in position between the position sensors 14, 15, is detected during starting of the turbine engine 100, it will be impossible to determine the healthy position sensor 14, 15 if a difference in position were to occur during the flight of the aircraft.

The method 200 verifies continuously the consistency between the positions of the position sensors 14, 15. This verification continues throughout the entire duration of operation of the turbine engine 100.

When a difference between the positions of the position sensors 14, 15 is detected 201 prior to starting 203 the turbine engine 100, this difference must be confirmed, when the starting 203 of the turbine engine 100 is initiated so that the subsequent steps of determination 207 of the position sensor 14, 15 having switched between the closed and open positions and storing 209 the healthy and faulty position sensors 14, 15 can be undertaken. In other words, the difference must have been detected prior to the starting of the turbine engine 100 and still be detected at the moment when the starting 203 of the turbine engine 100 is initiated. For this purpose, a minimum delay time t is for example provided between the detection 201 of the difference in position and the initiation of the starting 203 of the turbine engine 100, so as to confirm the difference between the positions of the position sensors 14, 15, if this difference in position is still detected at the conclusion of the delay t. This delay time t is for example pre-recorded in the data memory 44 of the control device 40. The delay time t is arbitrarily fixed, for example at 5s. This delay time must not be too short, so as not to confirm a false breakdown, nor too long to be able to take into account an engine which starts rapidly after the power-up of the computers of the engine and of the aircraft. It can be comprised between a hundred milliseconds and a minute. Also for this purpose, the difference between the positions of the position sensors 14, 15 is for example stored 202 as soon as it is detected 201, prior to the starting 203 of the turbine engine 100. The difference between the positions of the position sensors 14, 15 is for example recorded in the data memory 44 of the control device 40.

Thus the method 200 is only implemented if the difference in position between the position sensors 14, 15 has been confirmed. It could for example happen that a difference in position is detected, but that this difference disappears following the switching of the last of the position sensors 14, 15 which would only have been slower to switch.

Likewise, when a difference between the positions of the position sensors 14, 15 is detected 205 after the starting 203 of the turbine engine 100, this difference must still be detected when the first threshold $S_1$ is reached so that the subsequent step of storing 209 the healthy and faulty position sensors 14, 15 can take place. For this purpose, the difference between the positions of the position sensors 14, 15 is for example stored 206 as soon as it is detected 205, prior to the step of determining 207 the position sensor 14, 15 having switched. The difference between the positions of the position sensors 14, 15 is for example recorded in the data memory 44 of the control device 40.

Thus, the implementation of the method 200 is continued only if the difference in position between the position sensors 14, 15 is still effective when the first threshold $S_1$ is reached. It could for example happen that a difference in position is detected, but that this difference disappears following the switching of the last of the position sensors 14, 15, which would only have been slower to switch. The position sensors 14, 15 therefore have a time defined between the instant in which the state-change command is sent to the starter air valve 13 and the instant in which the turbine engine 100 reaches the first threshold $S_1$ to switch from the closed position to the open position.

Advantageously, following the determination 207 of the position sensor 14, 15 having switched between the closed position and the open position, in the correct direction in other words, the latter is stored 208. The position sensor 14, 15 having switched in the correct direction is for example recorded in the data memory 44 of the control device 40. In this way, the control device 40 retains in memory the position sensor 14, 15 having switched in the correct direction until the turbine engine 100 has reached the first threshold $S_1$. This datum can then be reused by the control device 40 for the subsequent step of storing 209 the healthy position sensor 14, 15 and the faulty position sensor 15, 14.

Preferably, the engine speed corresponds to the speed of rotation of the high-pressure shaft 110 of the turbine engine 100. This engine speed is also called N2.

The first threshold $S_1$ is for example pre-recorded in the data memory 44 of the control device 40. When the turbine engine 100 reaches the first threshold $S_1$, the combustion chamber 105 of the turbine engine 100 is not yet lit. This threshold $S_1$ must in fact be below the threshold of ignition of the engine, so as not to be "polluted" by the energy of the fuel. In other words, when the turbine engine 100 reaches the first threshold $S_1$, the fuel cutoff valve (not shown) of the fuel circuit of the turbine engine is in the closed position, so that the injectors of the combustion chamber 105 are not supplied with fuel. The first threshold $S_1$ depends on the sensor used, 765 rpm for example. Moreover, on certain types of aircraft, the value of this threshold is selected rather low, essentially to allow being sure that the engine is rotated only by the starter (and not by a headwind for example).

The healthy position sensor 14, 15 and the faulty position sensor 15, 14 are for example recorded 209 in the data memory 44 of the control device 40.

During the storing 209 of the healthy and faulty position sensors 14, 15, it is also stored, particularly by a recording in the data memory 44 of the control device 40, that the method 200 has in fact been implemented.

Having failed to detect a difference in position between the position sensors 14, 15, the method 200 can provide for storing, particularly by recording in the data memory 44 of the control device 40, that both position sensors 14, 15 are healthy.

Optional Logic:

The method 200 can further comprise the following steps consisting of:
- lighting 210 the combustion chamber 105 of the turbine engine 100;
- increasing 213 the engine speed of the turbine engine 100 until a predetermined second threshold $S_2$;
- during said increase 213 of the engine speed of the turbine engine 100:
  - sending 214 a state-change command to the starter air valve 13 so that it closes; then,
  - of a difference has been detected 211 between the positions of the position sensors 14, 15 prior to the step of sending 214 the state-change command to the starter air valve 13, one of the position sensors 14, 15 being in the closed position, the other of the position sensors 15, 14 being in the open position, determination 217 of the position sensor 14, 15 having switched between the open position and the closed position, the other position sensor 15, 14 having remained in the closed position;
  - otherwise:
    - detecting 215 a difference between the positions of the position sensors 14, 15, one of the position sensors 14, 15 being in the closed position, the other of the sensors 15, 14 being in the open position;
    - determining 217 of the position sensor 14, 15 having switched between the open position and the closed position, the other position sensor 15, 14 having remained in the open position;
- when the second threshold $S_2$ of the engine speed of the turbine engine 100 is reached:
  - storing 219 the position sensor 14, 15 having switched between the open position and the closed position as healthy and the position sensor 15, 14 remained in the closed position as faulty, so as to measure the state of the starter air valve 13 only on the basis of the positon of the healthy position sensor 14, 15.

In this way it is possible to confirm the fact that the position sensor 14, 15 which has been stored as healthy in the earlier step 209 does not show a fault during the closing of the starter air valve 13. This increases the reliability of the method 200.

Advantageously, following the determination 217 of the position sensor 14, 15 having switched in the correct direction, the latter is stored 218. The position sensor 14, 15 having switched in the correct direction is for example recorded in the data memory 44 of the control device 40. In this way, the control device 40 retains in memory the position sensor 14, 15 having switched in the correct direction until the turbine engine 100 has reached the second threshold $S_2$. This datum can then be reused by the control device 40 for the subsequent step of storing 219 the healthy position sensor 14, 15 and the faulty position sensor 15, 14.

The second threshold $S_2$ is for example pre-recorded in the data memory 44 of the control device 40. The second threshold $S_2$ is strictly greater than the first threshold $S_1$. This threshold is provided to allow the two position sensors 14, 15 to switch correctly. In fact, the valve taking for example 1s to close, it can then be considered that 2 s to 5 s later the position sensors have actually switched.

The lighting 210 of the combustion chamber 105 of the turbine engine 100 is for example initiated when a fourth predetermined threshold $S_4$ is reached. The fourth threshold $S_4$ is strictly greater than the first threshold $S_1$ and strictly less than the second threshold $S_2$. The fourth threshold $S_4$ is for example re-recorded in the data memory 44 of the control device 40. The fourth threshold $S_4$ is for example 3500 rpm. It corresponds to the speed of rotation of the high-pressure portions allowing good ignition of the combustion chamber. It depends on the aerodynamic conditions in the chamber and is therefore different for each engine model. It will generally be comprised between 3000 rpm and 6000 rpm depending on the applications.

The state-change command is for example sent 214 to the starter air valve 13, when the engine speed of the turbine engine 100 has reached a predetermined fifth threshold $S_5$. The fifth threshold $S_5$ is strictly greater than the first threshold $S_1$ and strictly less than the second threshold $S_2$, and if applicable strictly greater than the fourth threshold $S_4$. The fifth threshold $S_5$ is for example pre-recorded in the data memory 44 of the control device 40. The fifth threshold $S_5$ is for example 8560 rpm. This fifth threshold corresponds to the desynchronization of the starter with the engine which will, for its part, continue to accelerate. In fact, certain starters do not tolerate high speeds; the starter is therefore disconnected when it reaches its limit, during starting. There exist, however, certain starters capable of bringing the engine to a much higher speed; the cutoff of the starter is then accomplished once the engine is started, and the engine no longer accelerates afterward. In this case, a time threshold, and not a speed value, is used for the second threshold $S_2$.

When a difference between the positions of the position sensors 14, 15 is detected 211 prior sending 214 the state-change command to the starter air valve 13 so that it closes, this difference must still be detected when the state-change command is actually sent 214 to the starter air valve 13, to that the subsequent steps of determining 217 the position sensor having switched in the correct direction and storing 219 the healthy and faulty position sensors 14, 15 can take place. For this purpose, the difference between the positions of the position sensors 14, 15 is for example stored 212 as soon as it is detected 211, prior to sending 214 the state-change command to the starter air valve 13. The difference between the positions of the position sensors 14, 15 is for example recorded in the data memory 44 of the control device 40.

Likewise, when a separation between the positions of the position sensors 14, 15 is detected 215 after sending 214 the state-change command to the starter air valve 13 so that it closes, this difference must still be present when the second threshold $S_2$ is reached so that the subsequent step of storing 219 the healthy and faulty position sensors can take place. For that purpose, the difference between the positions of the position sensors 14, 15 is for example stored 218 as soon as it is detected 215. The difference between the positions of the position sensors 14, 15 is for example stored in the data memory 44 of the control device 40.

Thus, the implementation of the method 200 is continued only if the difference in position between the position sensors 14, 15 is still effective when the state-change command is sent 214 to the starter air valve 13 or when the second threshold $S_2$ is reached. It could for example happen that a difference in position is detected 211, 215 but that this difference disappears following the switching of the last position sensor 14, 15, which will only have been slower to switch.

The storing 219 of the healthy and faulty position sensors 14, 15 overwrites the storing 209 of the healthy and faulty position sensors 14, 15 which had been carried out previously during the opening of the starter air valve 13.

The method 200 can further comprise the following steps consisting of:
- stopping 220 the turbine engine 100, for example when the aircraft is on the ground;
- reducing 221 the engine speed of the turbine engine 100 until a predetermined third threshold $S_3$;
- when the engine speed has reached the third threshold $S_3$, deleting 222 of the data according to which one of the position sensors 14, 15 is healthy and the other of the position sensors 15, 14 is faulty.

Advantageously, when the engine speed has reached the third threshold $S_3$, the data according to which one or more difference in positions between the position sensors 14, 15 have been detected and/or the data identifying the position sensor 14, 15 having switched in the correct direction and/or the data according to which the method 200 has in fact been implemented are also deleted 222.

In other words, the method 200 is re-initialized 222 so as to be able to be re-implemented, particularly during the next flight of the aircraft. This allows avoiding taking into account a difference breakdown, when the position sensor 15, 14 considered to be faulty is henceforth operational. This is the case for example when the position sensor 15, 14 unblocks itself or when the starter air valve 13 has been repaired. This also allows ensuring the interchangeability of the control device 40.

The data according to which one of the position sensors 14, 15 is healthy and the other of the position sensors 15, 14 is faulty are for example deleted 222 from the data memory 44 of the control device 40. The same is true of the data according to which one or more difference in positions between the position sensors 14, 15 have been detected and/or of the data identifying the position sensor 14, 15 having switched in the correct direction and/or of the data according to which the method 200 has in fact been implemented.

The third threshold $S_3$ is for example pre-recorded in the data memory 44 of the control device 40. Preferably, when the turbine engine 100 reaches the third threshold $S_3$, the aircraft is on the ground. The third threshold $S_3$ is for example 3000 rpm. This threshold allows the identification of the end-of-mission of the airplane. In this example, it is considered that following a shut-down by the pilot, if the engine speed drops below 3000 rpm, then the airplane is at the end of its mission. This selection is arbitrary, depending on the practical feedback of the engine manufacturer. Other signals allowing defining the end of mission to be taken into account by the software can of course be used.

Figure 5:
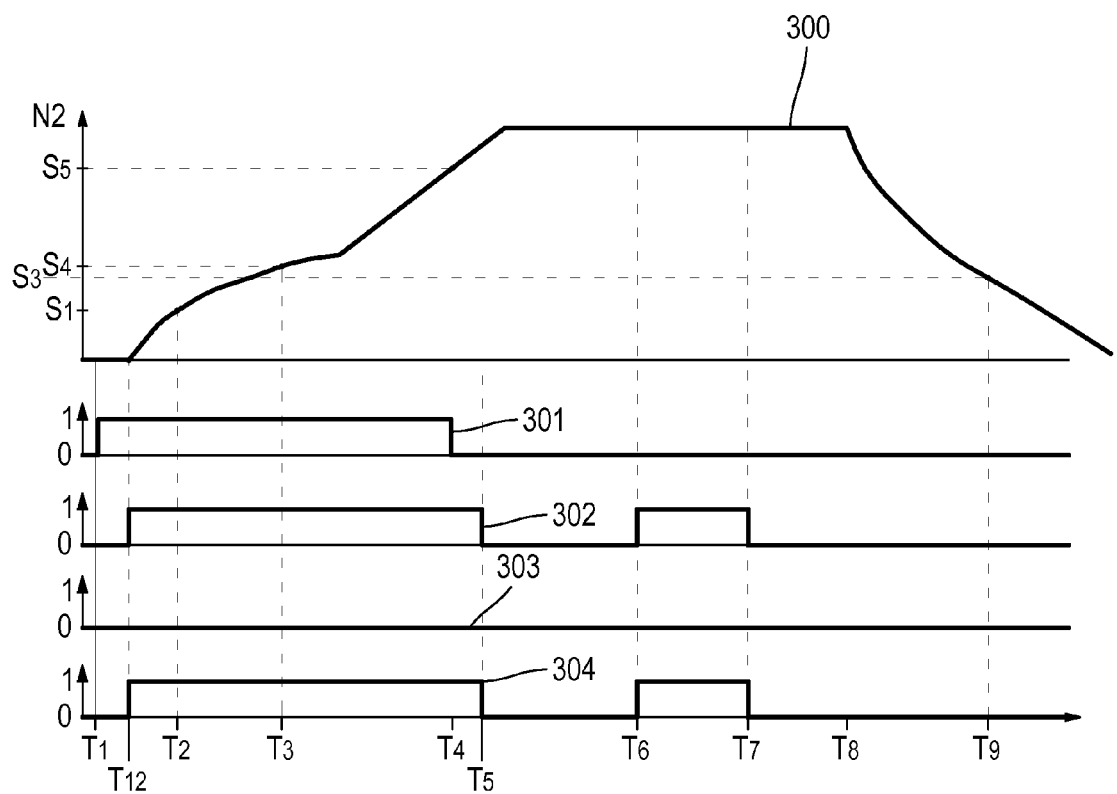
FIG. 5 is a set of curves showing the variations of the engine speed of the turbine engine, the state of the starter air valve, the position of each of the position sensors of said starter air valve and the measured state of the starter air valve.

Shown in FIG. 5 are several curves showing an example of operating conditions of the turbine engine 100 from its starting to its shut-down. In this example, as will be detailed later, a difference in position between the position sensors 14, 15 is detected after starting the turbine engine 100.

The first curve 300 corresponds to the engine speed, i.e. the speed of rotation, of the turbine engine 100.

The second curve 301 corresponds to the state of the starter air valve 13. In this second curve 301, the value 0 (zero) corresponds to the closed position and the value 1 (one) corresponds to the open position of the starter air valve 13.

The third and fourth curves 302, 303 correspond to the position of each of the position sensors 14, 15. In these third and fourth curves, the value 0 (zero) corresponds to the closed position and the value 1 (one) corresponds to the open position of the position sensors 14, 15.

The fifth curve 304 corresponds to the measured state of the starter air valve 13. In this fifth curve 304, the value 0 (zero) corresponds to the closed position and the value 1 (one) corresponds to the open position of the starter air valve 13.

At an instant T1, corresponding to the beginning of the starting phase of the turbine engine 100, the state change command is sent to the starter air valve 13 so that the latter opens. The position sensors 14, 15 are both closed. The measured state of the starter air valve is the closed position.

The engine speed of the turbine engine 100 increases until the first threshold $S_1$ which is reached at an instant T2.

Between the instant T1 and the instant T2, the first position sensor 14 switches into the open position, while the second position sensor 15 remains in the closed position. Upon switching of the first position sensor 14, at the instant T12, the difference between the position of the first and of the second position sensor 14, 15 is detected, and preferably stored, and the position sensor having switched in the correct direction is determined, and preferably stored, the position sensor having switched in the correct direction corresponding here to the first position sensor 14. By default, between the instant T12 and the instant T2, a difference in position between the position sensors 14, 15 having been detected, the measured state of the starter air valve 13 is the open position.

When the first threshold $S_1$ is reached at the instant T2, the difference between the positions of the position sensors 14, 15 still being present, the first position sensor 14 is stored as the healthy position sensor and the second position sensor 15 is stored as the faulty position sensor. Thus, during the entire duration of the operation of the turbine engine 100, and more precisely during the entire duration of the flight of the aircraft, the state of the starter air valve 13 will be measured only on the basis of the position of the first position sensor 14.

At an instant T3, the combustion chamber 105 of the turbine engine 100 is lit. In other words, the injection and the ignition of the fuel in the combustion chamber 105 are initiated at the instant T3. At this instant T3, the turbine engine 100 reaches for example the fourth threshold $S_4$.

At an instant T4, for example when the turbine engine 100 reaches the fifth threshold $S_5$, the state-change command is sent to the starter air valve 13 so that the latter closes.

At an instant T5, the first position sensor 14 switches into the closed position. The measured state of the starter air valve 13, on the basis of only the position of the first position sensor 14, is the closed position. It matters little that the second position sensor 15 is in the closed position.

At an instant T6, an untimely opening of the starter air valve 13 occurs. As indicated previously, such an opening of the starter air valve 13, during the flight of the aircraft, is particularly dangerous. The first position sensor 14 has switched into the open position, while the second position sensor 15 has remained in the closed position. However, as only the position of the first position sensor 14 is considered as representative of the state of the starter air valve 13, the measured state of the starter air valve 13 is indeed the open position. It therefore matters little that a difference in position between the position sensors 14, 15 is detected at instant T6, because the method 200 has already allowed determining which of the position sensors 14, 15 supplies reliable information on the state of the starter air valve 13. A message is for example sent to the pilot, for example via the user interface 47, to make him aware that the starter air valve 13 is in the open position and therefore has broken down.

At an instant T7, the starter air valve 13 re-closes itself. The first position sensor then switches into the closed position and the measured state of the starter air valve 13, on the basis of only the position of the first position sensor 14, is indeed the closed position. It matters little that the second position sensor 15 is in the closed position.

At an instant T8, the turbine engine 100 is shut down in order to reduce the engine speed. The aircraft is for example on the ground.

At an instant T9, the engine speed reaches the third threshold $S_3$. At this instant T9, the data according to which the first position sensor 14 is healthy and the second position sensor 15, 14 is faulty are deleted. The same is true of the difference in positions detected between the position sensors 14, 15 and the actual implementation of the method 200. The method 200 is thus re-initialized for the next flight of the aircraft.

The invention claimed is:

1. A method for managing a breakdown of a starter air valve of a starting circuit of an aircraft turbine engine, said starting circuit comprising a starter and a duct configured to be connected to a pressurized air supply device, the duct comprising the starter air valve configured to change state between a closed position in which the starter air valve blocks the duct and an open position in which the starter air valve puts into communication the pressurized air supply device and the starter, the starter air valve comprising two position sensors configured to switch between an open position when said starter air valve is in the open position and a closed position when said starter air valve is in the closed position, said method comprising the following steps:
   starting the turbine engine, a state-change command being sent to the starter air valve to open;
   increasing an engine speed of the turbine engine until a first predetermined threshold;
   during said increase of the engine speed of the turbine engine:
      if a difference has been detected between the positions of the two position sensors prior to the step of starting the turbine engine, one of the two position sensors being in the closed position, the other of the two position sensors being in the open position, determining the position sensor having switched between the closed position and the open position, the other position sensor having remained in the open position;
      otherwise:
         detecting a difference between the positions of the position sensors, one of the two position sensors being in the closed position, the other of the two sensors being in the open position;
         determining the position sensor having switched between the closed position and the open position, the other position sensor having remained in the closed position;
   when the first threshold of the engine speed of the turbine engine is reached:
      storing the position sensor having switched between the closed position and the open position as a healthy position sensor and of the position sensor remaining in the open or closed position as a faulty position sensor, so as to measure the state of the starter air valve only on the basis of the position of the healthy position sensor.

2. The method according to claim 1, wherein the starter air valve is verified, during the initiation of the starting of the turbine engine r when the turbine engine has reached the first threshold, that a difference is still detected between the positions of the position sensors.

3. The method according to claim 1, wherein the engine speed corresponds to a speed of rotation of a high-pressure shaft of the turbine engine.

4. The method according claim 1, wherein when the turbine engine reaches the first threshold, a combustion chamber of the turbine engine is not yet lit.

5. The method according to claim 1, further comprising the steps of:
   lighting a combustion chamber of the turbine engine;
   increasing the engine speed of the turbine engine until a second predetermined threshold:
   during said increase of the engine speed of the turbine engine:
      sending a state change command to the starter air valve to close; then,
      if a difference has been detected between the positions of the tw position sensors prior to the step of sending the state change command to the starter air valve, one of the two position sensors being in the closed position, the other of the two position sensors being in the open position, determining the position sensor having switched between the open position and the closed position, the other position sensor having remained in the closed position;
      otherwise:
         detecting a difference between the positions of the two position sensors, one of the position sensors being in the closed position, the other of the two position sensors being in the open position;
         determining the position sensor having switched between the open position and the closed position, the other position sensor having remained in the open position;
   when the second threshold of the engine speed of the turbine engine is reached:
      storing the position sensor having switched between the open position and the closed position as the healthy position sensor, and the position sensor remained in the closed or open position as a faulty position sensor, so as to measure the state of the starter air valve only on the basis of the position of the healthy position sensor.

6. The method according to claim 5, wherein the method is verified, during the sending of the state change command to the starter air valve or when the turbine engine has reached the second threshold, that a difference is still detected between the positions of the two position sensors.

7. The method according to claim 1, wherein the healthy position sensor having switched between the closed position and the open position or between the open position and the closed position is stored after having been determined.

8. The method according to claim 1, further comprising the steps of:
   shutting down the turbine engine;

reducing the engine speed of the turbine engine until a third predetermined threshold;

when the engine speed has reached the third threshold, deleting the data according to which one of the position sensors is healthy and the other of the position sensors is faulty.

9. A starting circuit of an aircraft turbine engine, comprising:

a starter, a duct configured to be connected to a pressurized air supply device, the duct comprising a starter air valve configured to change state between a closed position in which the starter air valve blocks the duct and an open position in which the starter air valve puts into communication the pressurized air supply device and the starter, the starter air valve comprising two position sensors configured to switch between an open position when said starter air valve is in the open position and a close position when said starter air valve is in the closed position, a controller configured to implement the steps of the method for managing a breakdown in the starter air valve according to claim 1.

10. An aircraft turbine engine comprising a starting circuit according to claim 9.

* * * * *